Aug. 10, 1943.  A. MIERSON  2,326,548
PROTECTOR FOR PLANTS AND THE LIKE
Filed Feb. 2, 1942
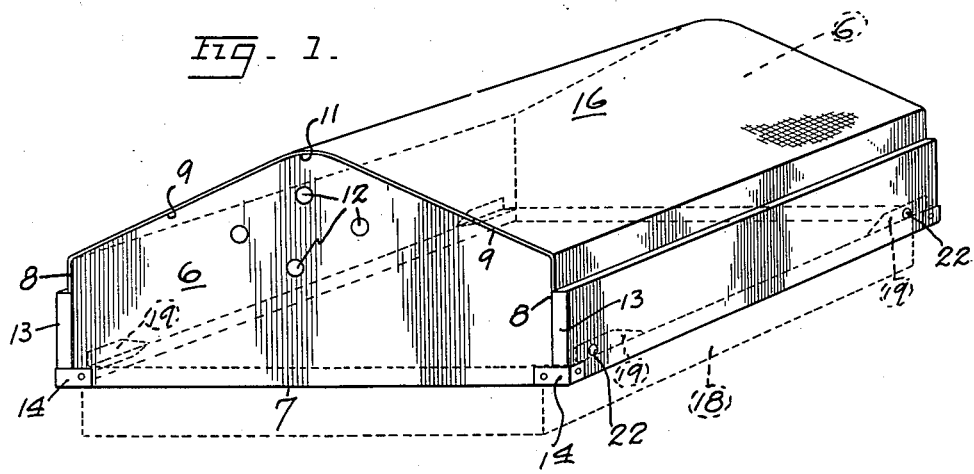
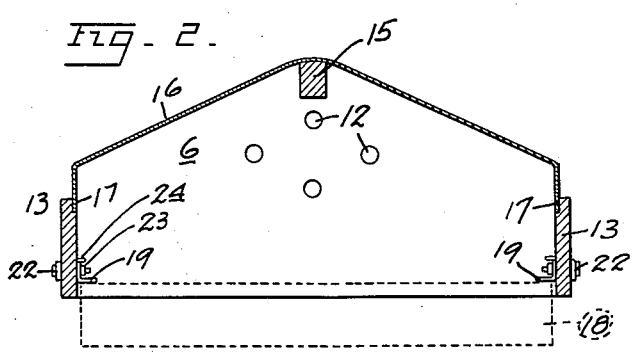
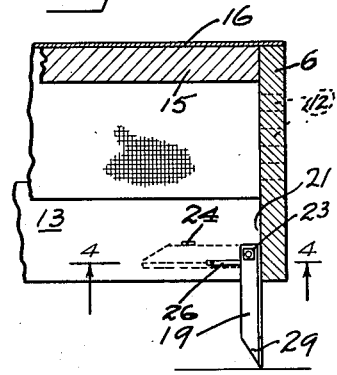
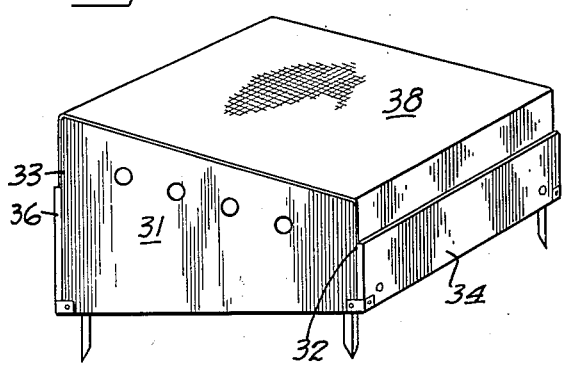
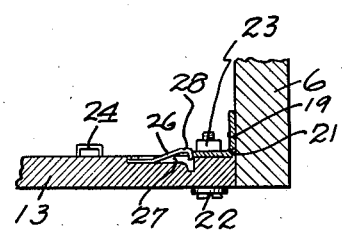
INVENTOR.
AUGUSTUS MIERSON
George B. White
ATTORNEY.

Patented Aug. 10, 1943

2,326,548

UNITED STATES PATENT OFFICE 2,326,548

PROTECTOR FOR PLANTS AND THE LIKE

Augustus Mierson, San Francisco, Calif.

Application February 2, 1942, Serial No. 429,250

3 Claims. (Cl. 47—28)

This invention relates to protectors for plants and the like.

The primary object of this invention is to provide a protecting cover for plants and the like which allows the exposure of the plants to air and sun yet keeps the plants covered so as to protect the plants from unfavorable weather, or from insects, birds and other harmful conditions to which the plants would be exposed if remained uncovered.

Another object of this invention is to provide a plant protector cover which fits over the usual tray or container for seeds, or young or sensitive plants yet allows air and sunshine to the plants, and which is positively located in predetermined position on such container or can be easily converted for direct support in the ground over an outside bed or plot.

Another object of this invention is to provide a protector for plants and the like which is highly useful and simple in construction. Convenience of arrangement, lightness and comparative inexpense of manufacture are further objects which have been borne in mind in the production and development of the invention.

It will be understood that various changes in the details of construction may be made without departing from the spirit or scope of the invention as defined by the appended claims.

With the foregoing and other objects in view, which will be made manifest in the following detailed description, reference is had to the accompanying drawing for the illustrative embodiment of the invention, wherein:

Fig. 1 is a perspective view of the protector, the flat containing the plants is indicated in broken lines.

Fig. 2 is a cross sectional view of the plant protector.

Fig. 3 is a fragmental sectional view of the plant protector, showing the supporting legs in ground penetrating position.

Fig. 4 is a fragmental sectional view taken on the lines 4—4 of Fig. 3, and

Fig. 5 is a perspective view of another form of the plant protector.

In carrying out my invention I make use of end boards 6, each of which in the illustrative embodiment shown in Fig. 1 has a substantially horizontal bottom edge 7, short vertical edges 8, and upwardly inclined top edges 9, which latter converge to a substantially central apex 11. Each end board 6 is provided with a plurality of ventilating holes 12. The opposite sides of the protector cover are formed by horizontal strips or side boards 13, the ends of which are suitably attached to the respective vertical edges 8 of the end boards 6 so as to form a rigid frame. The side boards 13 are narrower than the height of the respective vertical edges 8 of the end boards 6. The lower edge of each side board 13 is in the same plane as the bottom edges 7 of the end boards 6 so that the upper portions of the vertical edges 8 of the end boards 6 are left uncovered by said side boards 13. The corners of the frame are secured together by any suitable means, for instance by corner clamps or clips 14. A brace 15 extends across between the apices 11 of the end boards.

A sheet 16 of transparent or translucent material capable of allowing ultraviolet sun rays to pass therethrough is secured over the top edges 9, the brace 15 and over the upper portions of the vertical edges 8 of the end boards 6. The edges of the vertical sides of the transparent sheet 16 overlap the inner face of the side boards 13 as shown in Fig. 2 at 17. This cover sheet 16 is preferably of flexible, non shattering material, such as the translucent material called "celloglass."

The cover formed by the assembled end boards 6, side boards 13, and transparent top sheet 16 forms a protective enclosure for plants covered thereby, yet it allows the exposure of the plants to sun and air. A suitable tray such as a so called flat 18 is indicated by broken lines in Figs. 1 and 2. It is to be noted that in this preferred embodiment of the invention the bottom edges of the end boards and side boards of the cover fit over the outside of the top of this flat 18.

In order to support the cover on the flat 18 at a suitable height, I provide an abutment in each inside corner of the cover spaced from the bottom edges of the cover so that the lower portion of said side boards will overlap the outer surfaces of the flat 18 at the top to a degree determined by the location of these abutments. These abutments are formed by foldable legs 19 which are so made and so supported that they can function as supports for the cover both on a flat and also in the ground. The structures of these supports being identical the description of one will suffice. The leg 19 is made of angle cross section so as to fit into the inner corner 21 formed at the meeting ends of the end boards 6 and the side boards 13, as shown in Fig. 4. The inner end of the leg 19 is pivoted on a pivot screw 22 extended through the side board 13. On the inner end of the pivot screw 22 is a square nut 23 close to the corner of the angle of the leg 19 so that as the leg 23 is turned to the downwardly extended position it turns the nut 23 in one direction and when the leg 19 is folded into the cover it turns the nut in the other direction, preferably tightening the nut when the leg 19 is folded. This arrangement also prevents the loosening of the nut 23 on the pivot screw 22.

A stop 24 on the side board 13 is so located as to limit the inward swinging to the horizontal position of the leg 19, as shown in broken lines in Fig. 4. In this folded position the legs 19 rest on the top edge of the flat 18, and the pivot 21 and the stop 24 aid in supporting the weight of the cover in place. A suitable catch is provided to prevent the accidental folding of the leg 19 from its extended position. In this embodiment this catch is in the form of a spring bar 26 mounted in a recess 27 under the folded position of the leg 19. The end of the spring bar 26 farthest from the leg 19 is fixed in the recess. The other end of the spring bar 26 is bent outwardly from the recess 27 and terminates in a bent end 28 which abuts against the inner edge of the leg 19 when the leg is unfolded from the cover, as shown in Fig. 4. Thus the leg 19 is prevented from buckling outwardly by the inner corner 21 of the cover, and from buckling inwardly by the bent end 28 of the spring bar 26. In order to fold the leg 19 the spring bar 26 is depressed into the recess 27 and the leg 19 is folded thereover. The pressure of the spring bar 26 on the underside of the leg 19 when folded creates further frictional resistance against the accidental dropping or unfolding of the leg 19. The outer end 29 of the leg 19 is cut to a point for easier penetration into the soil when the cover is used on an outside bed directly on the ground.

The modified form of the protective cover shown in Fig. 5 is similar to the first described form, except that end boards 31 have a lower front vertical edge 32 and a higher vertical rear edge 33, and one side board 34 is lower than the other side board 36 of the cover. This results in a single inclined top plane 38. The side boards 34 and 36 are shorter than the respective vertical sides 32 and 33 of the end boards 31, so that the transparent or translucent sheet covering overlaps down to the top parts of the vertical edges 32 and 33 of the end boards 31. In other respects this cover operates similarly to the first described form.

In operation the protective covering can be used in the nature of a greenhouse or the like to protect young seedlings, or plants from wind, insects, birds or the like harmful exposures. These plants may be in the usual trays or flats, in which instance the legs of the protective cover are folded so as to function as supporting abutments to rest on the top edge of the flat. In the event a bed of plants in the open ground is to be protected, then the legs are unfolded and pressed into the ground to a desired depth to hold the protective cover in suitable position. Thus the plants beneath this protective cover are fully protected yet exposed to the beneficial rays of the sun and the air. While I refer herein to the side panels or frame members of the device as boards, it is to be understood that these frame members may be made of any suitable material other than wood. The device is simple in structure, positive in operation, and unitary in character, and therefore it readily lends itself to use by the ordinary layman.

I claim:

1. A protective cover for plants and the like, comprising a frame, a transparent wall on the frame, means to locate the frame on the borders of a surface to be protected, and means to selectively hold said locating means in abutment position within the frame and in extended ground engaging position.

2. A protective cover for plants and the like, comprising end walls having opposed vertical edges, side walls attached to the respective edges of the end walls and being of such height as to leave free an upper portion of each of the vertical edges of said end walls, a flexible transparent sheet extended over the top of the frame formed by said walls and down so as to overlap said side walls, said flexible sheet being secured to the top edges and the exposed top portions of the vertical edges of the end walls, the frame formed by said walls slidably fitting over a tray for plants and the like, and means on the frame to limit overlapping of said frame, said limiting means being adapted to be converted into legs for holding the frame above a bed of ground directly.

3. The combination with a protector for plants and the like, having a frame and transparent top on the frame, the bottom of the frame being open and fitting over the sides of a tray for plants and the like; of spacing and supporting means for the protector, comprising, foldable legs on the frame, means to hold the legs in folded position so as to rest on the tray and support the protector in spaced position above the tray, and means to hold said legs in extended position so as to be inserted into the ground to hold the protector in spaced position above the surface of the ground irrespective of a tray.

4. The combination with a protector for plants and the like, having a frame and transparent top on the frame, the bottom of the frame being open and fitting over the sides of a tray for plants and the like; of spacing and supporting means for the protector, comprising, pivoted legs on the frame, a stop adjacent each leg to hold the legs in folded position so as to act as abutments to rest on the sides of trays and support the protector in position on the trays, and means to hold the legs against buckling in the extended position to be inserted in the ground to hold the protector above the surface of the ground.

5. The combination with a protector for plants and the like, having a frame and transparent top on the frame, the bottom of the frame being open and fitting over the sides of a tray for plants and the like; of spacing and supporting means for the protector, comprising, pivoted legs on the frame, a stop adjacent each leg to hold the legs in folded position so as to act as abutments to rest on the sides of trays and support the protector in position on the trays, and releasable means to hold the legs against buckling in the extended position to be inserted in the ground to hold the protector above the surface of the ground.

6. The combination with a protector for plants and the like, having a frame and transparent top on the frame, the bottom of the frame being open and fitting over the sides of a tray for plants and the like; of spacing and supporting means for the protector, comprising, pivoted legs on the frame, a stop adjacent each leg to hold the legs in folded position so as to act as abutments to rest on the sides of trays and support the protector in position on the trays, and means to hold the legs against buckling in the extended position to be inserted in the ground to hold the protector above the surface of the ground, said holding means including a stop member resiliently secured to the inside of said frame so as to abut against an edge of each leg in the extended position.

7. The combination with a protector for plants and the like, having a frame and transparent top on the frame, the bottom of the frame being open and fitting over the sides of a tray for plants and the like; of spacing and supporting means for the protector, comprising, pivoted legs on the frame, a stop adjacent each leg to hold the legs in folded position so as to act as abutments to rest on the sides of trays and support the protector in position on the trays, and each of said pivoted legs fitting into an inside corner of the frame so as to be braced thereby in the extended position, said frame having a recess adjacent each leg, a spring stop in each recess abutting against an edge of the leg so as to obstruct its pivoting to folding position, said spring stop being compressible into said recess to permit the folding of the leg, said spring stop being under the folded positions of the respective legs to increase the frictional resistance to the unfolding of the legs.

8. The combination with a protector for plants and the like, having a frame and transparent top on the frame, the bottom of the frame being open and fitting over the sides of a tray for plants and the like; of spacing and supporting means for the protector, comprising, pivoted legs on the frame adapted to act as rests on the tray when folded spaced from the bottom of the protector and to act as legs in the ground in the extended positions, said pivot including a tightening element turned with the legs so as to tighten the pivot when the legs are folded and hold the legs collapsed.

AUGUSTUS MIERSON.